(12) United States Patent
Haynes et al.

(10) Patent No.: US 11,010,845 B2
(45) Date of Patent: May 18, 2021

(54) IEC 61968-9:2013 SCHEMAS FOR A UTILITY SYSTEM'S COMMUNICATIONS

(71) Applicant: Aclara Technologies LLC, St. Louis, MO (US)

(72) Inventors: David Haynes, St. Peters, MO (US); Timothy Dierking, Kirkwood, MO (US)

(73) Assignee: Aclara Technologies LLC, St. Louis, MO (US)

( * ) Notice: Subject to any disclaimer, the term of this patent is extended or adjusted under 35 U.S.C. 154(b) by 0 days.

(21) Appl. No.: 16/334,173

(22) PCT Filed: Sep. 27, 2017

(86) PCT No.: PCT/US2017/053721
§ 371 (c)(1),
(2) Date: Mar. 18, 2019

(87) PCT Pub. No.: WO2018/064167
PCT Pub. Date: Apr. 5, 2018

(65) Prior Publication Data
US 2019/0213163 A1 Jul. 11, 2019

Related U.S. Application Data

(60) Provisional application No. 62/402,098, filed on Sep. 30, 2016.

(51) Int. Cl.
*G06Q 50/06* (2012.01)
*G06F 13/42* (2006.01)
(Continued)

(52) U.S. Cl.
CPC ............. *G06Q 50/06* (2013.01); *G06F 13/42* (2013.01); *G06F 13/4265* (2013.01);
(Continued)

(58) Field of Classification Search
CPC ......... G06Q 50/06; H04L 67/12; H04L 69/22; G06F 13/4265; G06F 13/42
See application file for complete search history.

(56) References Cited

U.S. PATENT DOCUMENTS 5,903,594 A * 5/1999 Saulnier .................. H04B 1/69
340/12.33
7,616,656 B2 * 11/2009 Wang .................... H04L 67/025
370/463

(Continued)

FOREIGN PATENT DOCUMENTS

WO 2009112081 A1 9/2009

OTHER PUBLICATIONS

Sherif Sakr, XML compression techniques: a survey and comparison, Journal of Computer and System Sciences, No. 75, 2009, pp. 303-322.

(Continued)

Primary Examiner — Glenn A. Auve
(74) Attorney, Agent, or Firm — Michael Best & Friedrich, LLP

(57) ABSTRACT

Improvements to IEC 61968-9:2013 meter reading schemas. These include significantly compressing messages into a single integer number which, when transmitted over a utility's communication system, is used to configure meters at utility user locations, obtain meter data, command and control operations at a utility location, and expand messaging capabilities. A method is disclosed for simplifying the IEC 61968-9:2013 schema for communications between a HeadEnd utility communications facility and the meter at an EndPoint so to enable use of the schema for operations it could not previously perform. While providing this enhanced capability, the IEC 61968-9:2013 schema's ability (Continued)

to function for its intended purpose; i.e., meter reading and control, is not compromised or impeded.

15 Claims, 4 Drawing Sheets

(51) Int. Cl.
    *H02J 13/00*     (2006.01)
    *H04L 29/08*     (2006.01)
    *H04L 29/06*     (2006.01)

(52) U.S. Cl.
    CPC .......... *H02J 13/0006* (2013.01); *H04L 67/12* (2013.01); *H04L 69/22* (2013.01)

(56) References Cited

U.S. PATENT DOCUMENTS

| | | |
|---|---|---|
| 2004/0205207 A1 | 10/2004 | Motoyama |
| 2012/0179957 A1 | 7/2012 | Jhang et al. |
| 2013/0275736 A1 | 10/2013 | Kelley et al. |
| 2015/0097694 A1 | 4/2015 | Laval et al. |
| 2016/0301778 A1* | 10/2016 | Gupta .................... H04L 67/10 |
| 2018/0094948 A1* | 4/2018 | Haynes ................ G06Q 50/06 |

OTHER PUBLICATIONS

Spanish Patent Application No. P201990028 Search Report published Nov. 7, 2019.
International Search Report for corresponding PCT/US2017/053721 dated Jan. 5, 2018.

* cited by examiner

IEC 61968-9:2013 SCHEMAS FOR A UTILITY SYSTEM'S COMMUNICATIONS

RELATED APPLICATIONS

This application claims the benefit of U.S. provisional application, 62/402,098 filed Sep. 30, 2016, and International Application PCT/US2017/053721 filed Sep. 27, 2017 and published under International Publication No. WO 2018/064167, by David Haynes and Timothy Dierking for "Improvements to IEC 61968-9:2013 Schemas For A Utility System's Communications", both of which are incorporated herein by reference.

BACKGROUND OF THE INVENTION

This invention relates to communications for electric and other utilities; and, more particularly, to a method and apparatus for enhanced and improved communications between a utility and its customers.

A utility supplies a particular commodity (electricity, gas, water) through a distribution system to numerous end users. Typically, the utility installs a meter at each customer location to measure the amount of the commodity consumed by that customer at that facility or site. Over time, these meters have developed into what are now generally referred to as "smart meters" in that they can now not only measure usage of the commodity; but, also receive operational instructions from the utility to, for example, control or configure a load on the utility's distribution system based on current weather or other conditions, send reports or updates on conditions at a particular customer's location to the utility, and perform other functions.

Communications between a utility and its customers are carried out using certain standards such as, for example, International Electrotechnical Commission (IEC) standard 61968-9:2013. IEC 61968 comprises a series of standards for information exchange in an electrical distribution system, the standards having different schemas for different business purposes. The IEC 61968-9 (hereinafter sometimes referred to as "Part-9") standard relates to electricity meters, meter reading and control; i.e., communications between a utility's head end facility (HeadEnd or HE) which receives, processes, and transmits signals over the utility's communications network to a communications module installed in the meter at a customer location; i.e., an end point (EndPoint or EP).

A recent edition of the Part-9 standard lists 28 schemas many of which are used for configuration and control of communication system components. It has been found that support for these schemas can be difficult and expensive for a computationally constrained device; and that even though some of the schema are quite large, they are still not necessarily adequate to meet a utility's need for certain applications. Also, current schema is somewhat cumbersome. As an illustration, a "read meter" request in the IEC format is formatted as a "string" of whole numbers (integers) and dots ("."). A complicated technique (not described) is required to build an identifier which defines or describes the unit of measure for an electric meter's measurement.

For example, to request a typical dial reading off the face of a residential electricity meter, the identifier used in an Application Programming Interface (API) is a string such as 0.0.0.1.4.1.12.0.0.0.0.0.0.0.0.3.72.0.

The construction rules for this particular string specify 18 fields composed of characters; i.e., the digits and the dots.

The present invention is directed to extensions to IEC 61968-9:2013 Reading Type identifiers to support EndPoint configurability; i.e., the configuration of the device (utility meter) to which instructions, data, and information requests are sent.

SUMMARY OF THE INVENTION

The present disclosure is directed to improvements to IEC 61968-9:2013 meter reading schemas to extend the Reading Type identifiers to support the configuration of an EndPoint (EP) device (i.e., a utility meter) to which instructions, data, and information requests are sent. Such improvements include significantly compressing the number of bytes used to compose messages sent from a HeadEnd (HE) location to the EP to obtain meter data and other information, to configure a meter, and to expand the schema's messaging capabilities beyond the schema's current capabilities. In one application, a capability is now provided that allows reconfiguring of devices having limited computational capabilities both without requiring the use of additional, specialized schemas, and by eliminating the need for schemas previously used.

Use of the method accomplishes the goals of first, specifically serializing a Part-9 schema to communicate meter data and events; and, second, to create an API based on the Part-9 standard so that, in addition to communicating meter readings, control parameters can also be transmitted to configure the meter so to govern the operation of remotely located equipment.

The method not only simplifies the schema for communications between a HeadEnd and an EndPoint (meter), but also enables use of the schema for operations heretofore not capable of being performed using the schema. In achieving this enhanced capability, the standard's ability to function for its intended purpose; i.e., meter reading and control, is not compromised or impeded.

In addition, the method enables a different formulation for a message string transmitted from a HeadEnd to an EndPoint so to simplify and ease communications between them while at the same time expanding a meter's capabilities. The method allows custom parameters to be defined, these then being written and read like standard reading types. In addition, the work-flow required for the formulation of a string can be re-used so to simplify the programming required to support configurability of a meter and its communication module.

In accordance with the invention, the method utilizes the Part-9 "MeterReadings" schema used for meter readings and alarms. Now, "MeterReadings" schema is enhanced so that in addition to its current functions, it is extended to transmit configuration parameters between components. Because of this enhanced capability, Part-9 schema otherwise used for component configuration is not necessarily needed. Further in accordance with the invention, formulation of a message sent between a HeadEnd and an EndPoint results in a single integer number being transmitted rather than a string of integers and dots. This represents a significant reduction in the requirements for computationally constrained devices and the cost of using them.

The improvements of the invention by which fewer bytes need to be transmitted has the advantages of enabling more devices to communicate over a constrained communications channel, as well as enabling battery operated communication devices to remain operational for longer periods of time before a device's battery is exhausted.

Other objects and features will be in part apparent and in part pointed out hereinafter.

DESCRIPTION OF THE DRAWINGS

The accompanying figures, together with detailed description which follows, form part of the specification and illustrate the various embodiments described in the specification.

Corresponding reference characters indicate corresponding parts throughout the several views of the drawings.

DESCRIPTION OF A PREFERRED EMBODIMENT

Figure 1:
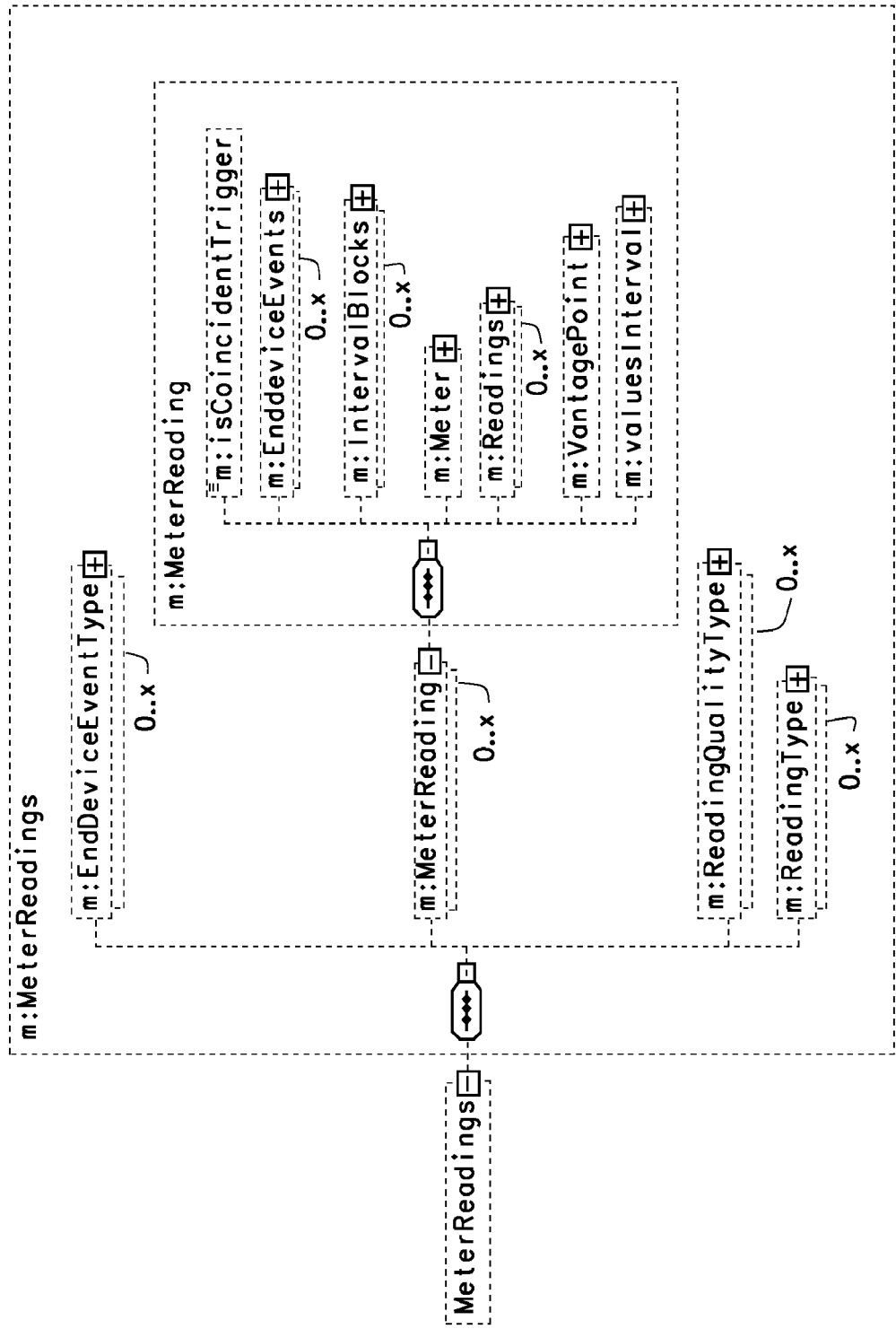
FIG. 1 illustrates an IEC 61968-9 schema for meter readings as well as end device events.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

For purposes of this disclosure, HeadEnd shall be understood to mean a software suite which is part of an advanced metering information (AMI) system which publishes data from field equipment (e.g., smart meters). EndPoint shall be understood to mean field equipment, particularly the communications module in a smart meter, transponder, etc.

Figure 2:
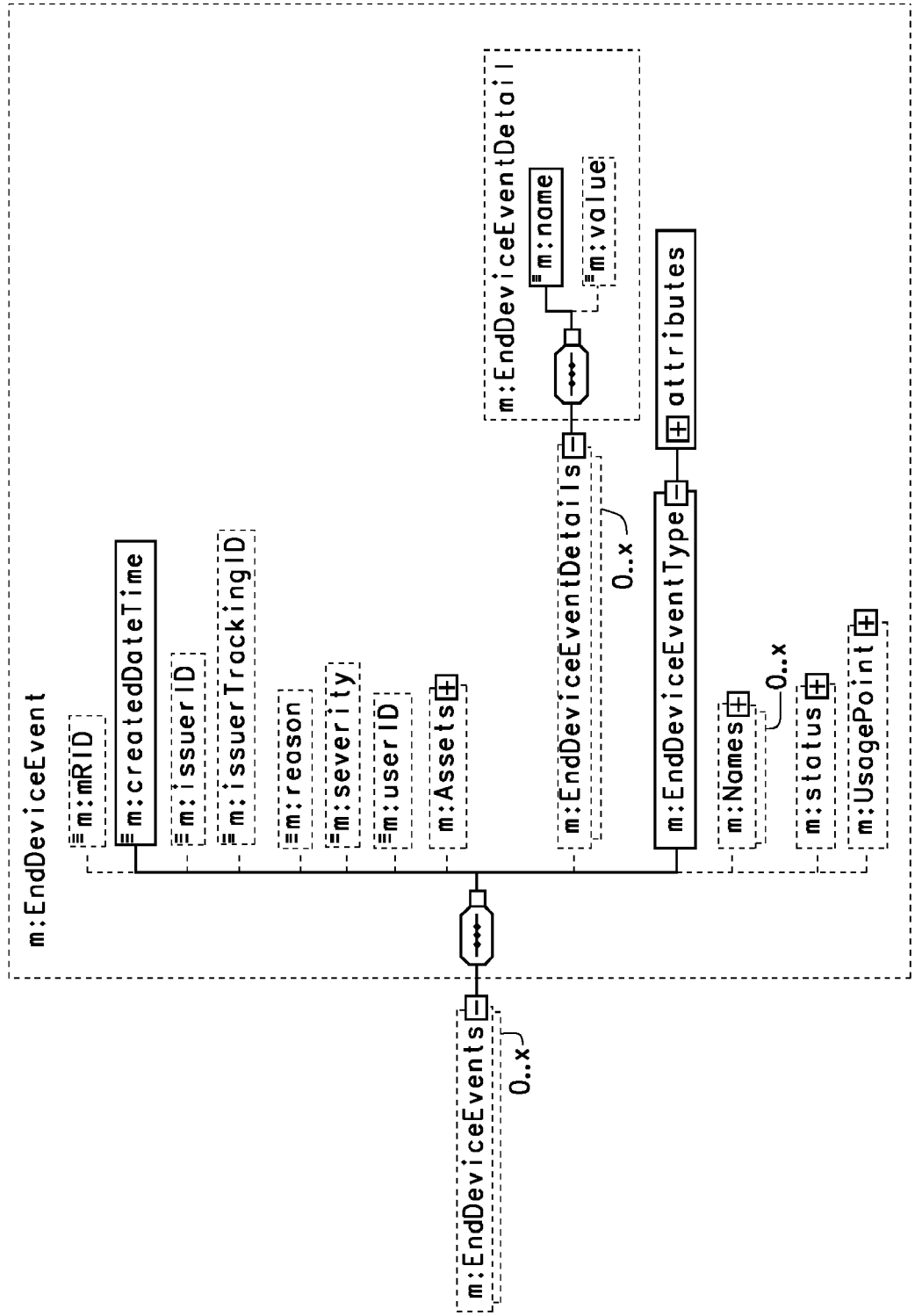
FIG. 2 is a continuation of the schema of FIG. 1 for end device events.
Figure 3:
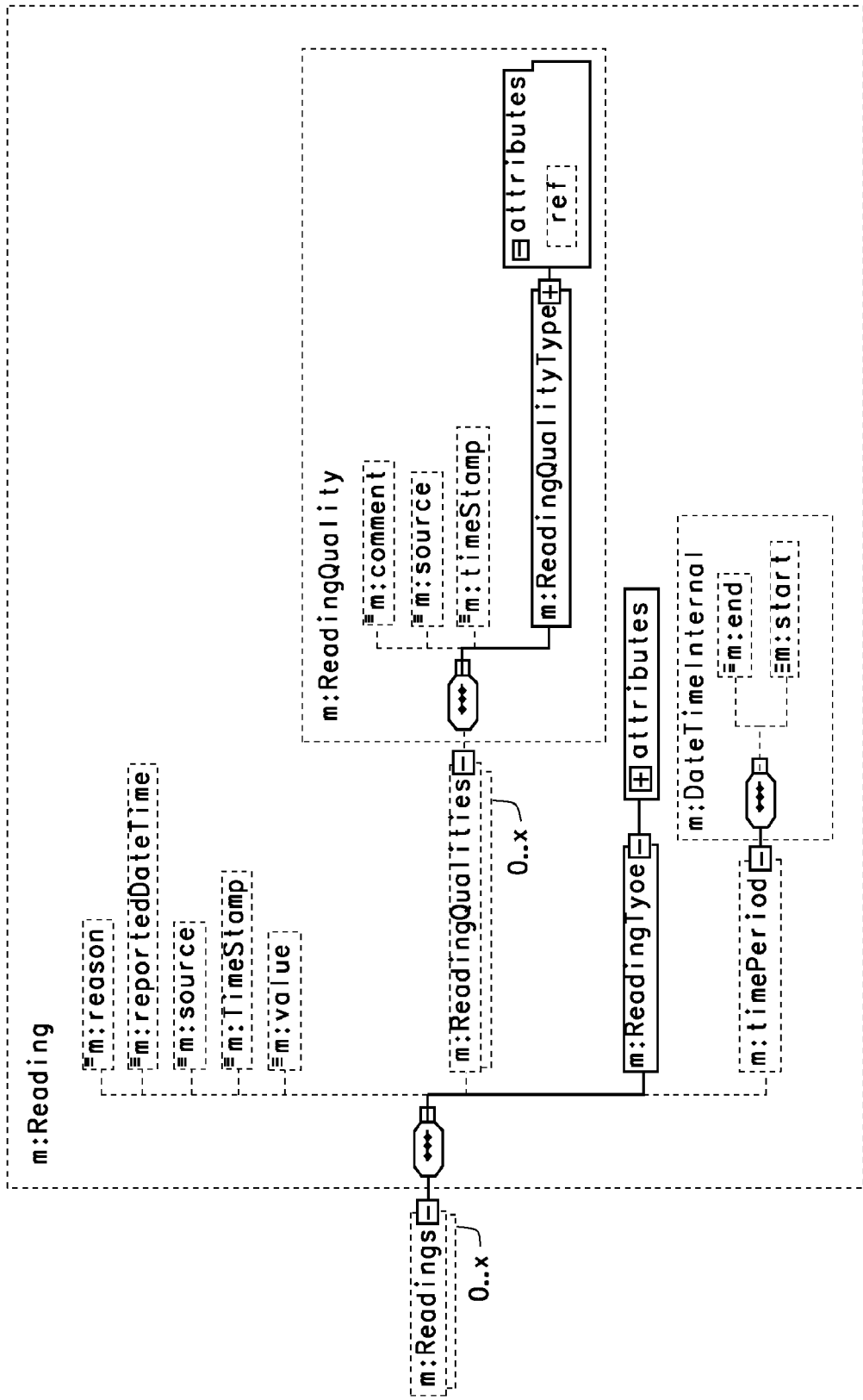
FIG. 3 is a further continuation of the schema of FIG. 1 for meter readings; and, FIG. 4 illustrates a portion of a Part-9 schema for communication module configurations.

Referring to FIGS. 1-3, there is represented a format for formulating a string using a conventional IEC 61968-9:2013 meter reading schema for obtaining a reading from an electric meter. In FIG. 1, the major headings or identifiers for the transmission are shown. In FIG. 2, sub-headings or identifiers for End Device Events are shown. In FIG. 3, sub-headings or identifiers for a Reading are shown.

In accordance with the present invention, meter readings and custom parameters are enumerated in a HEEP (HeadEndEndPoint) list, and a particular enumeration is then transmitted as an integer. The message in the HEEP reading Type enumeration corresponding to a net kilowatt hours reading is transmitted as the integer "20" rather than, for example, the string "0.0.0.1.4.1.12.0.0.0.0.0.0.0.3.72.0".

The foregoing string of characters is generated using extensible markup language (XML) which is well known in the art.

The following example illustrates the conversion from an XML form to a HEEP serialization in accordance with the invention.

Load Profile data with alarms.

Interval data utilizes a MeterReadings.xsd in XML, and a "Compact Meter Reads" bit structure in the HEEP.

Formulation in XML is as follows:

```
<EventMessage xmlns="http://iec.ch/TC57/2011/schema/message">
  <Header>
    <Verb>created</Verb>
    <Noun>MeterReadings</Noun>
  </Header>
  <Payload>
<MeterReadings         xmlns:m="http://iec.ch/TC57/2011/
                       MeterReadings#"
xmlns:xsi="http://www.w3.org/2001/XMLSchema-instance"
xsi:schemaLocation="http://iec.ch/TC57/2011/MeterReadings#
MeterReadings.xsd">
    <m:MeterReading>
        <m:EndDeviceEvents>
            <m:createdDateTime>2013-07-
16T09:28:32Z</m:createdDateTime>
            <m:EndDeviceEventType ref="3.2.22.150"/>
            <!--electricMeter.battery.charge.
                minLimitReached-->
        </m:EndDeviceEvents>
        <m:EndDeviceEvents>
            <m:createdDateTime>2013-07-
16T09:30:47Z</m:createdDateTime>
            <m:EndDeviceEventType ref="3.18.83.79"/>
            <!--electricMeter.memory.program.error-->
        </m:EndDeviceEvents>
        <m:EndDeviceEvents>
            <m:createdDateTime>2001-12-
17T09:30:47Z</m:createdDateTime>
            <m:EndDeviceEventDetails>
    <m:name>0.0.0.1.0.1.148.0.0.0.0.0.0.0.0.111.0</m:name>
                <!-- bulkQuantity
electricitySecondaryMetered tamper (count) -->
                <m:value>3</m:value>
            </m:EndDeviceEventDetails>
            <m:EndDeviceEventType ref="3.12.93.219"/>
            <!--electricMeter.security.rotation.reversed-->
        </m:EndDeviceEvents>
        <m:IntervalBlocks>
            <m:IntervalReadings>
                <m:value>23.45678</m:value>
            </m:IntervalReadings>
            <m:ReadingType
ref="0.0.6.4.1.1.12.0.0.0.0.0.0.0.3.72.0"/>
                <!--fiveMinute        deltaData       forward
electricitySecondaryMetered energy (kWh)-->
        </m:IntervalBlocks>
        <m:IntervalBlocks>
            <m:IntervalReadings>
                <m:value>0.00000</m:value>
            </m:IntervalReadings>
            <m:ReadingType
ref="0.0.6.4.19.1.12.0.0.0.0.0.0.0.3.72.0"/>
                <!--fiveMinute        deltaData       reverse
electricitySecondaryMetered energy (kWh)-->
        </m:IntervalBlocks>
        <m:IntervalBlocks>
            <m:IntervalReadings>
                <m:value>1.23456</m:value>
            </m:IntervalReadings>
            <m:ReadingType
ref="0.0.6.4.1.1.12.0.0.0.0.0.0.0.3.73.0"/>
                <!--fiveMinute        deltaData       forward
electricitySecondaryMetered energy (kVArh)-->
        </m:IntervalBlocks>
        <m:IntervalBlocks>
            <m:IntervalReadings>
                <m:value>479.9</m:value>
            </m:IntervalReadings>
            <m:ReadingType
ref="0.0.0.6.0.1.54.0.0.0.0.0.0.0.128.0.29.0"/>
                <!--indicating   electricitySecondaryMetered
voltage-rms phaseA (V)-->
        </m:IntervalBlocks>
        <m:IntervalBlocks>
            <m:IntervalReadings>
                <m:value>480.0</m:value>
            </m:IntervalReadings>
            <m:ReadingType
```

```
ref="0.0.0.6.0.1.54.0.0.0.0.0.0.0.64.0.29.0"/>
            <!--indicating   electricitySecondaryMetered
voltage-rms phaseB (V)-->
        </m:IntervalBlocks>
            <m:IntervalBlocks>
        <m:IntervalReadings>
            <m:value>10.0</m:value>
        </m:IntervalReadings>
        <m:ReadingType
ref="0.0.0.6.0.1.54.0.0.0.0.0.0.0.32.0.29.0"/>
            <!--indicating   electricitySecondaryMetered
voltage-rms phaseC (V)-->
        </m:IntervalBlocks>
        <m:Meter>
            <m:Names>
                <m:name>12345</m:name>
            </m:Names>
        </m:Meter>
        <m:valuesInterval>
            <m:end>2013-07-16T10:30:00Z</m:end>
        </m:valuesInterval>
    </m:MeterReading>
</m:MeterReadings>
    </Payload>
</EventMessage>
```

The resulting size of the XML message is approximately 2920 bytes long.

The HEEP version is rendered in accordance with the following chart:

| Element | Binary | Decimal | Hex | Size in bytes |
|---|---|---|---|---|
| Interface Revision Number | | 0 | 00 | 1 |
| TransactionType = BubbleUp | 10 | 131 | 83 | 1 |
| resource = /bu/lp | 00 0011 | | | |
| method = POST | | 2 | 02 | 1 |
| RequestID | | 2 | 02 | 1 |
| valuesInterval.end = 2013-07-16T10:30:00Z | | 1373970600 | 51E520A8 | 4 |
| AlarmQty = 3 | 0011 | 54 | 36 | 1 |
| ReadingQty = 6 | 0110 | | | |
| EndDeviceEvents.createdDateTime = 2013-07-16T09:28:32Z | | 1373966912 | 51E51240 | 4 |
| EndDeviceEvents.EndDeviceEventType = Low Battery | | 23 | 0017 | 2 |
| NameValuePairQty | 0000 | 0 | 00 | 1 |
| EndDevEDValueSize | 0000 | | | |
| EndDeviceEvents.createdDateTime = 2013-07-16T09:30:47Z | | 1373967047 | 51E512C7 | 4 |
| EndDeviceEvents.EndDeviceEventType = Meter Flash Memory Error | | 17 | 0011 | 2 |
| NameValuePairQty | 0000 | 0 | 00 | 1 |
| EndDevEDValueSize | 0000 | | | |
| EndDeviceEvents.createdDateTime = 2001-12-17T09:30:47Z | | 1008581447 | 3C1DBB47 | 4 |
| EndDeviceEvents.EndDeviceEventType = reverse rotation detected | | 11 | 000B | 2 |
| NameValuePairQty | 0001 | 17 | 11 | 1 |
| EndDevEDValueSize | 0001 | | | |
| EndDeviceEventDetails.name = reverse rotation count.3.12.93.219 | | 1033 | 0409 | 2 |
| EndDeviceEventDetails.value | | 3 | 03 | 1 |
| timeStampPresent = FALSE | 0 | 42 | 2A | 1 |
| ReadingQualitiesPresent = FALSE | 0 | | | |
| PendingPowerOfTen = −5 | 10 1 | | | |
| ReadingValueSizeInBytes = 3B | 010 | | | |
| ReadingType = 5 min deltaData fwd kWh | | 73 | 0049 | 2 |
| Readings.value | | 2345678 | 23CACE | 3 |
| timeStampPresent = FALSE | 0 | 40 | 28 | 1 |
| ReadingQualitiesPresent = FALSE | 0 | | | |
| Pending PowerOfTen = −5 | 10 1 | | | |
| ReadingValueSizeInBytes = 1B | 000 | | | |
| ReadingType = 5 minute deltaData rev kWh | | 75 | 004B | 2 |
| Readings.value | | 0 | 00 | 1 |
| timeStampPresent = FALSE | 0 | 42 | 2A | 1 |
| ReadingQualitiesPresent = FALSE | 0 | | | |
| PendingPowerOfTen = −5 | 10 1 | | | |
| ReadingValueSizeInBytes = 3B | 010 | | | |
| ReadingType = 5 minute deltaData fwd kVArh | | 72 | 0048 | 2 |
| Readings.value = 1.23456 | | 123456 | 01E240 | 3 |
| timeStampPresent = FALSE | 0 | 9 | 09 | 1 |
| ReadingQualitiesPresent = FALSE | 0 | | | |
| PendingPowerOfTen = −1 | 00 1 | | | |
| ReadingValueSizeInBytes = 2B | 001 | | | |
| ReadingType = Volts RMS Ph A | | 34 | 0022 | 2 |
| Readings.value = 479.9 | | 4799 | 12BF | 2 |
| timeStampPresent = FALSE | 0 | 9 | 09 | 1 |
| ReadingQualitiesPresent = FALSE | 0 | | | |
| PendingPowerOfTen = −1 | 00 1 | | | |
| ReadingValueSizeInBytes = 2B | 001 | | | |
| ReadingType = Volts rms Ph B | | 36 | 0024 | 2 |
| Readings.value = 480.0 | | 4800 | 12C0 | 2 |
| timeStampPresent = FALSE | 0 | 8 | 08 | 1 |
| ReadingQualitiesPresent = FALSE | 0 | | | |
| PendingPowerOfTen = −1 | 00 1 | | | |
| ReadingValueSizeInBytes = 1B | 000 | | | |
| ReadingType = Volts Ph C | | 35 | 0023 | 2 |
| Readings.value = 10.0 | | 100 | 64 | 1 |
| Size | | | | 63 |

With regard to the above, it will be noted the identification of the particular meter (meter ID) is not represented because it is represented at a different layer.

Importantly, using the HEEP bit structure now reduces the size of the transmitted message from 2920 bytes in the XML format to only 63 bytes. This is a reduction of approximately 98% in the number of bytes having to be transmitted to obtain the same information.

By way of another example, Real-time Alarms such as the "last gasp" and "power restored" alarms use a "MeterReadings.xsd" in XML, and a "Full Meter Reads" bit structure in the HEEP.

Formulation in XML is as follows:

```
<EventMessage xmlns="http://iec.ch/TC57/2011/schema/message">
    <Header>
        <Verb>created</Verb>
        <Noun>MeterReadings</Noun>
    </Header>
    <Payload>
        <m:MeterReadings    xmlns:m="http://iec.ch/TC57/2011/
        MeterReadings#"
```

-continued

```
xmlns:xsi="http://www.w3.org/2001/XMLSchema-instance"
xsi:schemaLocation="http://iec.ch/TC57/2011/MeterReadings#
MeterReadings.xsd">
    <m:MeterReading>
        <m:isCoincidentTrigger>false</m:isCoincidentTrigger>
        <m:EndDeviceEvents>
            <m:createdDateTime>2015-01-
13T11:15:08Z</m:createdDateTime>
            <m:EndDeviceEventType ref="26.26.0.216"/>
            <!--comDevice.power..restored-->
        </m:EndDeviceEvents>
        <m:Meter>
            <m:Names>
                <m:name>12345</m:name>
            </m:Names>
        </m:Meter>
        <m:Readings>
            <m:value>34</m:value>
            <m:ReadingType
ref="0.0.0.1.0.1.137.0.0.0.0.0.0.0.0.111.0"/>
            <!--bulkQuantity
electricitySecondaryMetered powerQuality (count)-->
        </m:Readings>
        <m:Readings>
            <m:value>240.1</m:value>
            <m:ReadingType
ref="0.0.0.6.0.1.54.0.0.0.0.0.0.0.0.128.0.29.0"/>
            <!--indicating   electricitySecondaryMetered
voltage-rms phaseA (V)-->
        </m:Readings>
        <m:Readings>
            <m:value>240.1</m:value>
            <m:ReadingType
ref="0.0.0.6.0.1.54.0.0.0.0.0.0.0.0.64.0.29.0"/>
            <!--indicating   electricitySecondaryMetered
voltage-rms phaseB (V)-->
        </m:Readings>
        <m:Readings>
            <m:value>240.2</m:value>
            <m:ReadingType
ref="0.0.0.6.0.1.54.0.0.0.0.0.0.0.0.32.0.29.0"/>
            <!--indicating   electricitySecondaryMetered
voltage-rms phaseB (V)-->
        </m:Readings>
        <m:valuesInterval>
            <m:end>2015-01-13T11:15:10Z</m:end>
            <!--This is a common timestamp for all readings
            and events that otherwise do not have a timestamp
            provided.- -->
        </m:valuesInterval>
    </m:MeterReading>
</m:MeterReadings>
</Payload>
</EventMessage>
```

This XML version requires 1699 bytes.

The HEEP version is rendered in accordance with the following chart:

| Element | Binary | Decimal | Hex | Size in bytes |
|---|---|---|---|---|
| Interface Revision Number | | 0 | 00 | 1 |
| TransactionType = BubbleUp | 10 | 129 | 81 | 1 |
| resource = /bu/am | 00 | | | |
| | 0001 | | | |
| method = POST | | 2 | 02 | 1 |
| RequestID | | 26 | 1A | 1 |
| valuesInterval.end = 2015-01-13T11:15:10 | | 1421147710 | 54B4FE3E | 4 |
| AlarmQty = 1 | 0001 | 20 | 14 | 1 |
| ReadingQty = 4 | 0100 | | | |
| End DeviceEvents. createdDateTime = 2015-01-13T11:15:08 | | 1421147708 | 54B4FE3C | 4 |
| EndDeviceEvents. | | 120 | 0078 | 2 |

| Element | Binary | Decimal | Hex | Size in bytes |
|---|---|---|---|---|
| EndDeviceEventType = comDevice.power..restored | | | | |
| NameValuePairQty | 0000 | 0 | 00 | 1 |
| EDEventDetailValueSize | 0000 | | | |
| IsCoincidentTrigger = FALSE | 0 | 0 | 00 | 1 |
| timeStampPresent = FALSE | 0 | | | |
| ReadingQualitiesPresent = FALSE | 0 | | | |
| RSVD | 0 0 | | | |
| PendPowerOfTen = None | 000 | | | |
| ReadingsValueSizeInBytes | 0000 | 23 | 0017 | 2 |
| | 0000 | | | |
| | 0001 | | | |
| RSVD | 0 | | | |
| ReadingsValueTypecast = uint | 111 | | | |
| ReadingType = powerQuality count | | 128 | 0080 | 2 |
| Readings.value | | 34 | 22 | 1 |
| IsCoincidentTrigger = FALSE | 0 | 1 | 01 | 1 |
| timeStampPresent = FALSE | 0 | | | |
| ReadingQualitiesPresent = FALSE | 0 | | | |
| RSVD | 0 0 | | | |
| PendPowerOfTen = deci | 001 | | | |
| ReadingsValueSizeInBytes | 0000 | 39 | 0027 | 2 |
| | 0000 | | | |
| | 0010 | | | |
| RSVD | 0 | | | |
| ReadingsValueTypecast = uint | 111 | | | |
| ReadingType = voltage phase A | | 34 | 0022 | 2 |
| Readings.value | | 2401 | 0961 | 2 |
| IsCoincidentTrigger = FALSE | 0 | 1 | 01 | 1 |
| timeStampPresent = FALSE | 0 | | | |
| ReadingQualitiesPresent = FALSE | 0 | | | |
| RSVD | 0 0 | | | |
| PendPowerOfTen = deci | 001 | | | |
| ReadingsValueSizeInBytes | 0000 | 39 | 0027 | 2 |
| | 0000 | | | |
| | 0010 | | | |
| RSVD | 0 | | | |
| ReadingsValueTypecast = uint | 111 | | | |
| ReadingType = voltage phase B | | 36 | 0024 | 2 |
| Readings.value = 240.1 | | 2401 | 0961 | 2 |
| IsCoincidentTrigger = FALSE | 0 | 1 | 01 | 1 |
| timeStampPresent = FALSE | 0 | | | |
| ReadingQualitiesPresent = FALSE | 0 | | | |
| RSVD | 0 0 | | | |
| PendPowerOfTen = deci | 001 | | | |
| ReadingsValueSizeInBytes | 0000 | 39 | 0027 | 2 |
| | 0000 | | | |
| | 0010 | | | |
| RSVD | 0 | | | |
| ReadingsValueTypecast = uint | 111 | | | |
| ReadingType = voltage phase C | | 35 | 0023 | 2 |
| Readings.value = 240.2 | | 2402 | 0962 | 2 |
| Size | | | | 43 |

In accordance with the method of the invention, the HEEP version requires only 43 bytes which is ≈2½% of that required in the XML version.

It will be understood by those skilled in the art that the results of both examples comprise significant savings in system's operation in order to acquire the same information as previously obtained using the XML protocols and represent significant reductions in the requirements for computationally constrained or restricted memory devices and the cost of using them.

By way of example, certain communication channels are constrained such that only limited amounts of information can be transmitted over them. Accordingly, the ability to be able to transmit fewer bytes over the channel to communicate instructions or acquire data now allows more devices to communicate over such channels. In addition, some communication devices are battery operated and the length of time they can communicate is limited by the amount of bytes they have to transmit to communicate instructions or acquire data before their batteries run low. Having to transmit fewer bytes, as a result of the improvements of the present invention now allows these devices to remain operational for longer periods of time before a device's battery is exhausted.

In addition to these advantages, a further advantage of the improvements of the present invention is that they provide the capability of reconfiguring devices such as smart meters, for example, without requiring support for additional, specialized schemas. Currently, the Part-9 schema defines MeterReadings.xsd to be 21 kB in size. However, in accordance with the invention, MeterReadings.xsd can now be also be used to perform configuration changes and this reuse allows other schemas to be used. These include, for example, MeterConfig.xsd which is defined as being 42 kB in size, and ComModuleConfig.xsd which is defined as being 17 kB in size. Further, other schemas previously being used now become unnecessary. All of this saves valuable memory space in devices having limited computational capabilities. An example of this feature is described below.

Figure 4:
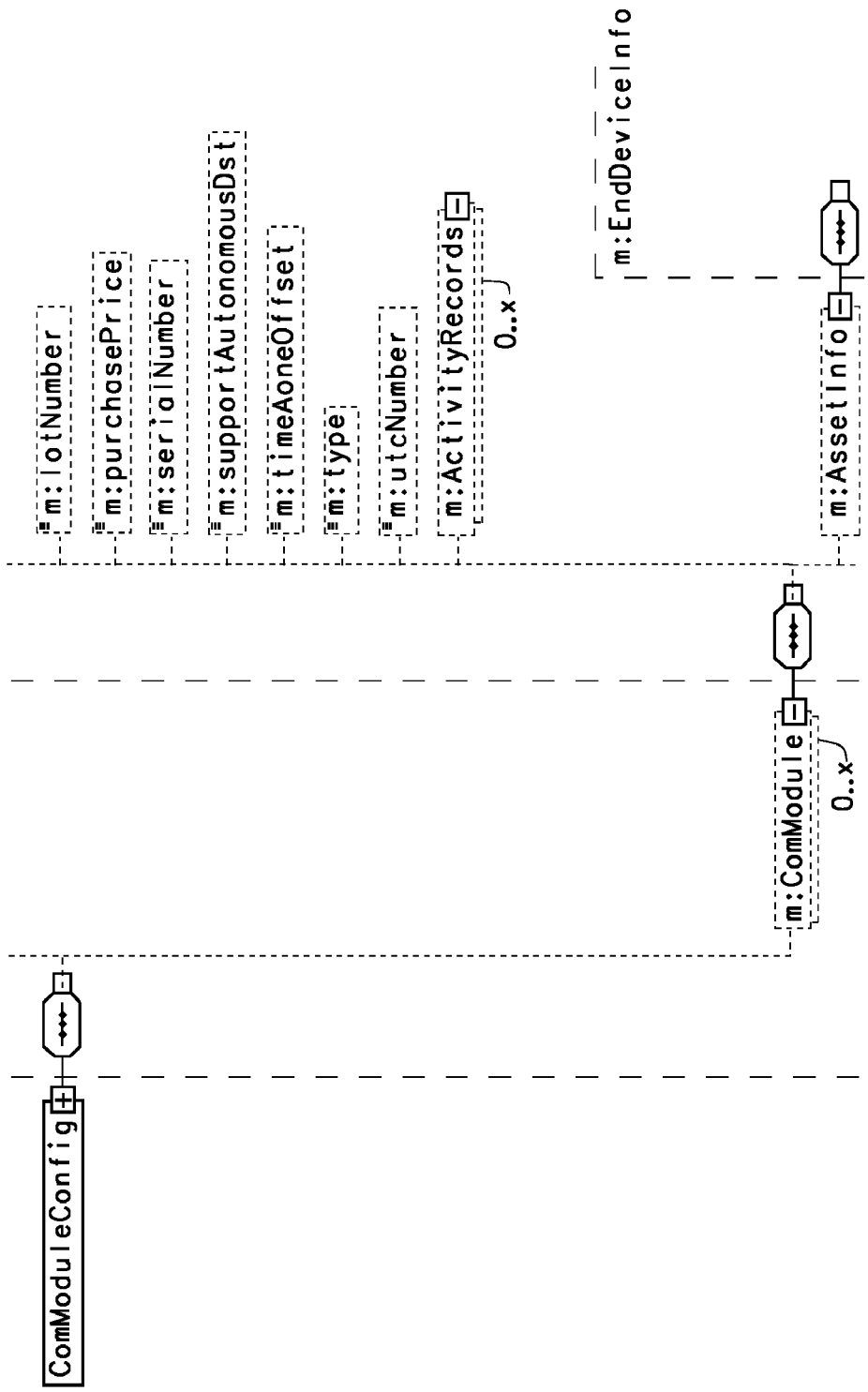

Referring to FIG. 4, there is represented a portion of a Part-9 schema for communication module configurations. In addition to data gathering and control instructions per the two previous examples, the method of the invention further permits changes or adjustments in the communications module of a smart meter to affect system's operations. These adjustments can be done "over the air" and the Part-9 standard, the portion of which is shown in FIG. 4, employs an XML schema for this purpose. The following is an example of a configuration to a meter's setting for a time-zone offset.

The Schema employed is ComModuleConfig.xsd., and the XML process is as follows:

```
<EventMessage xmlns="http://iec.ch/TC57/2011/schema/message">
  <Header>
  <Verb>changed</Verb>
<Noun>ComModuleConfig</Noun>
</Header>
<Payload>
   <m:ComModuleConfig
   xmlns:m="http://iec.ch/TC57/2011/ComModuleConfig#"
   xmlns:xsi="http://www.w3.org/2001/XMLSchema-instance"
   xsi:schemaLocation="http://iec.ch/TC57/2011/ComModuleConfig#
   comModuleConfig.xsd">
     <m:ComModule>
        <m:timeZoneOffset>-6.0</m:timeZoneOffset>
        <m:electronicAddress>
            <m:mac>12345</m:mac>
        </m:electronicAddress>
     </m:ComModule>
   </m:ComModuleConfig>
  </Payload>
</EventMessage>
```

As formulated, the message requires 546 bytes.

In the HEEP version according to the method of the invention, this time zone parameter is treated as any other reading and carries a parameter write within an "ExchangeWithID" bit structure and the HEEP version is rendered in accordance with the following chart:

| Element | Binary | Decimal | Hex | Size in Bytes |
|---|---|---|---|---|
| Interface Revision Number | | 0 | 00 | 1 |
| TransactionType = Request | 00 | 30 | 1E | 1 |
| resource = /or/pm | 01 1110 | | | |
| MethodStatus = PUT | | 3 | 03 | 1 |
| RequestID | | 6 | 06 | 1 |
| EDEvent | 0000 | 2 | 02 | 1 |
| ReadingQty | 0001 | | | |
| isCoincidentTrigger = FALSE | 0 | 0 | 00 | 1 |
| timeStampPresent = FALSE | 0 | | | |
| ReadingQualitiesPresent = FALSE | 0 | | | |
| RSVD | 0 0 | | | |
| PendingPowerOfTenAdjustment | 000 | | | |
| ReadingsValueSizeInBytes | 0000 0000 0001 | 21 | 0015 | 2 |
| RSVD | 0 | | | |
| ReadingsValueTypecast = INT | 101 | | | |
| ReadingType = timeZoneOffset | | 1224 | 04C8 | 2 |
| Readings.value = −6.0 hr = −21,600 seconds | | −21,600 | FFABA0 | 3 |
| | | | Size | 12 |

Again In accordance with the method of the invention, the HEEP version requires only 12 bytes which is ≈2% of that required in the XML version.

In view of the above, it will be seen that the several objects and advantages of the present disclosure have been achieved and other advantageous results have been obtained.

Having thus described the invention, what is claimed and desired to be secured by Letters Patent is:

1. A system for generating a utilities communication schema comprising:
a utilities communication schema generator configured to generate a Head End-End Point (HEEP) bit structure based upon a message transmitted from a HeadEnd to an EndPoint in an XML protocol format, wherein the generated HEEP bit structure contains the message in fewer bytes than the XML protocol format and improves communications between the HeadEnd and EndPoint by increasing a number of types of messages which can be transmitted between the HeadEnd and the EndPoint.

2. The system of claim 1 wherein the generated HEEP bit structure facilitates a communication of messages to devices computationally constrained from handling messages in the XML protocol format, thereby enabling communication with a greater amount of devices than could otherwise be communicated with if the messages were only generated using the XML protocol format.

3. The system of claim 1 wherein the generated HEEP bit structure enables battery operated communication devices to remain operational for longer periods of time before a device's battery is exhausted because the use of fewer bytes reduces a battery drain of a battery operated device in receiving and processing the message.

4. The system of claim 1 wherein the generated HEEP bit structure facilitates a reconfiguration of devices having limited computational capabilities both without requiring a use of additional, specialized message schemas, and by eliminating a need for schema use in the future when additional messages are generated.

5. The system of claim 1 wherein the generated HEEP bit structure transmitted between the HeadEnd and EndPoint only comprises a single integer number rather than a string of integers and dots as is required using the XML protocol format.

6. The system of claim 1 wherein the generated HEEP bit structure allows custom parameters to be defined for a meter, the parameters being written and read as other standard reading types.

7. The system of claim 6 wherein the generated HEEP bit structure accommodates extended MeterReading schemas, thereby enabling a transmission of configuration parameters between devices including other utility meters.

8. The system of claim 7 wherein the generated HEEP bit structure facilitates a reconfiguration of devices without requiring a use of specialized schemas or schemas previously used for reconfiguring the devices.

9. A method for improving communications in a utility's communication system comprising:
   reformatting a message generated in an IEC 61968-9 schema from a XML protocol format into a Head End-End Point (HEEP) format in which the message is transmitted from a HeadEnd (HE) location to an End-Point (EP) location at which a utility meter is located, the message so generated requiring a fewer number of bytes to produce and transmit in the HEEP format than in the XML protocol format;
   transmitting the message from the HeadEnd location to the EndPoint location through the utility's communication system in the HEEP format to obtain readings from the utility meter at the EndPoint and to command and control events occurring at the EndPoint using the utility meter at the EndPoint location, reducing the number of bytes comprising the transmitted message and increasing a number of message types which can be transmitted between the HeadEnd and the EndPoint.

10. The method of claim 9 further comprising facilitating, via the HEEP format, a communication of the message to devices computationally constrained from handling messages in XML protocol format, thereby enabling communication with a greater amount of devices than could otherwise be communicated with if the message was not reformatted to HEEP format.

11. The method of claim 9 wherein the transmitted message enables battery operated communication devices to remain operational for longer periods of time before a device's battery is exhausted because the reduced number of bytes reduces a battery drain by a battery operated communication device in receiving and processing the messages.

12. The method of claim 9 further comprising providing, via the HEEP format, a capability to reconfigure devices without requiring a use of additional, specialized message schemas by eliminating a need for schemas utilized if messages were generated in the XML, protocol format.

13. The method of claim 9 further comprising transmitting the message, via the HEEP format, between the HeadEnd and EndPoint as a single integer number rather than a string of integers and dots as is required if the message was generated using the XML protocol format.

14. The method of claim 9 further comprising enabling, via the HEEP format, custom parameters to be defined for a meter, the parameters being written and read as other standard reading types.

15. The method of claim 14 further comprising extending MeterReading schemas, via the HEEP format, to enable a transmission of configuration parameters between devices within the utility's communication system including other utility meters.

* * * * *